(12) United States Patent
Austin (10) Patent No.: US 11,390,342 B2
(45) Date of Patent: Jul. 19, 2022

(54) MACHINE AND WALKING ASSEMBLY FOR MACHINE

(71) Applicant: Caterpillar Global Mining LLC, Tucson, AZ (US)

(72) Inventor: David Stanley Austin, Racine, WI (US)

(73) Assignee: Caterpillar Global Mining LLC, Tucson, AZ (US)

( * ) Notice: Subject to any disclaimer, the term of this patent is extended or adjusted under 35 U.S.C. 154(b) by 222 days.

(21) Appl. No.: 16/899,938

(22) Filed: Jun. 12, 2020

(65) Prior Publication Data
US 2021/0387686 A1 Dec. 16, 2021

(51) Int. Cl.
*B62D 57/032* (2006.01)

(52) U.S. Cl.
CPC .................................. *B62D 57/032* (2013.01)

(58) Field of Classification Search
CPC .............................. B62D 57/02; B62D 57/032
See application file for complete search history.

(56) References Cited

U.S. PATENT DOCUMENTS

| 3,265,145 A | 8/1966 | Beitzel |
| 4,252,204 A | 2/1981 | Bishop |
| 4,329,795 A | 5/1982 | Kalve |
| 5,040,314 A | 8/1991 | Kalve |
| 5,941,326 A | 8/1999 | Fleuchaus |
| 6,067,734 A | 5/2000 | Kallenberger |
| 10,556,631 B2 * | 2/2020 | Smith ................... B62D 57/032 |
| 10,562,574 B2 | 2/2020 | Dumitru |
| 2020/0055555 A1 * | 2/2020 | Williams ................... B66F 3/26 |

* cited by examiner

*Primary Examiner* — Kevin Hurley (57) ABSTRACT

A walking assembly for a machine includes a walking shoe and a driving assembly including a walking frame, a driving member, and a linkage member pivotally coupled to the driving member and the walking shoe. The walking assembly also includes a sliding assembly coupled to the walking shoe and the walking frame. The sliding assembly includes a support structure adapted to be received within the walking shoe and sliding assembly plate member mounted on the support structure. The sliding assembly further includes a pair of roller chains adapted to roll on a contact surface of the plate member. The sliding assembly includes a sliding shoe adapted to be coupled with the walking frame that is in rolling contact with the pair of roller chains. The sliding assembly also includes a guiding assembly to retain the sliding shoe in rolling contact with the pair of roller chains.

20 Claims, 7 Drawing Sheets

MACHINE AND WALKING ASSEMBLY FOR MACHINE

TECHNICAL FIELD

The present disclosure relates to a machine and a walking assembly for the machine.

BACKGROUND

Walking assembly is conventionally used in a machine, such as a dragline excavator, for movement of such machines. The walking assembly allows the machine to walk in order to move the machine on ground surfaces. The walking assembly generally includes a driving mechanism having a walking frame. Further, the driving mechanism is coupled to a walking shoe of the walking assembly. The driving mechanism operates to allow horizontal and vertical movement of the walking shoe. Further, the walking assembly includes a sliding mechanism associated therewith. The sliding mechanism is disposed between the walking frame and the walking shoe. The sliding mechanism includes a sliding shoe that facilitates a sliding motion between the walking frame and the walking shoe. More particularly, the sliding shoe typically defines a bottom sliding surface that slides and contacts an upper sliding surface defined by the walking shoe. The bottom sliding surface and the upper sliding surface includes flat surfaces.

Generally, during machine operation, large loads and deflections are introduced in the walking assembly which may result in a premature wear out of the sliding surfaces. Further, lubrication separation between the sliding surfaces may be challenging due to high operating pressures and an inherent difficulty in lubrication of the flat sliding surfaces. Moreover, the deflections in the walking shoe may create point loading between the two sliding surfaces. In situations wherein the point loading exceeds mechanical properties of materials of the sliding surfaces, components of the sliding mechanism and/or the walking shoe may be subjected to premature failure.

U.S. Pat. No. 4,329,795 describes a walking dragline excavator including a massive hollow internally reinforced base frame which has built-in annular rail girder means over which annular track means are carried for running thereon of roller means adapted for supporting the revolving frame on the annular track means. Load stress distribution between the base frame and the revolving frame is attained by having an annular area contiguous to the perimeter of the base frame of greater resilient flexibility than the remainder of the base frame. Means comprising either bolts or clips are provided for releasably connecting the track means to the base frame and for permitting load stress relief circumferentially directed relative movement of the track means and the base frame under load transmitted through roller means by the revolving frame during load lifting and operational revolving of the revolving frame.

SUMMARY OF THE DISCLOSURE

In one aspect of the present disclosure, a walking assembly for a machine is provided. The walking assembly includes a walking shoe. The walking assembly also includes a driving assembly including a walking frame, a driving member supported by the walking frame, and a linkage member pivotally coupled to the driving member at one end and the walking shoe at another end. The walking assembly further includes a sliding assembly coupled to the walking shoe and the walking frame of the driving assembly. The sliding assembly includes a support structure adapted to be received within the walking shoe. The sliding assembly also includes a plate member mounted on the support structure. The plate member defining a contact surface. The sliding assembly further includes a pair of roller chains disposed adjacent to each other, the pair of roller chains defining a first side and a second side. The pair of roller chains are adapted to roll on the contact surface of the plate member proximate the first side of the pair of roller chains. The sliding assembly includes a sliding shoe adapted to be coupled with the walking frame. The sliding shoe is in rolling contact with the pair of roller chains proximate the second side of the pair of roller chains. The sliding assembly also includes a guiding assembly adapted to be coupled with the support structure. The guiding assembly is adapted to retain the sliding shoe in rolling contact with the pair of roller chains.

In another aspect of the present disclosure, a machine is provided. The machine includes a machine frame. The machine also includes a pair of walking assemblies supported by the machine frame. Each walking assembly includes a walking shoe. Each walking assembly also includes a driving assembly including a walking frame, a driving member supported by the walking frame, and a linkage member pivotally coupled to the driving member at one end and the walking shoe at another end. Each walking assembly further includes a sliding assembly coupled to the walking shoe and the walking frame of the driving assembly. The sliding assembly includes a support structure adapted to be received within the walking shoe. The sliding assembly also includes a plate member mounted on the support structure, the plate member defining a contact surface. The sliding assembly further includes a pair of roller chains disposed adjacent to each other, the pair of roller chains defining a first side and a second side. The pair of roller chains are adapted to roll on the contact surface of the plate member proximate the first side of the pair of roller chains. The sliding assembly includes a sliding shoe adapted to be coupled with the walking frame. The sliding shoe is in rolling contact with the pair of roller chains proximate the second side of the pair of roller chains. The sliding assembly also includes a guiding assembly adapted to be coupled with the support structure. The guiding assembly is adapted to retain the sliding shoe in rolling contact with the pair of roller chains.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
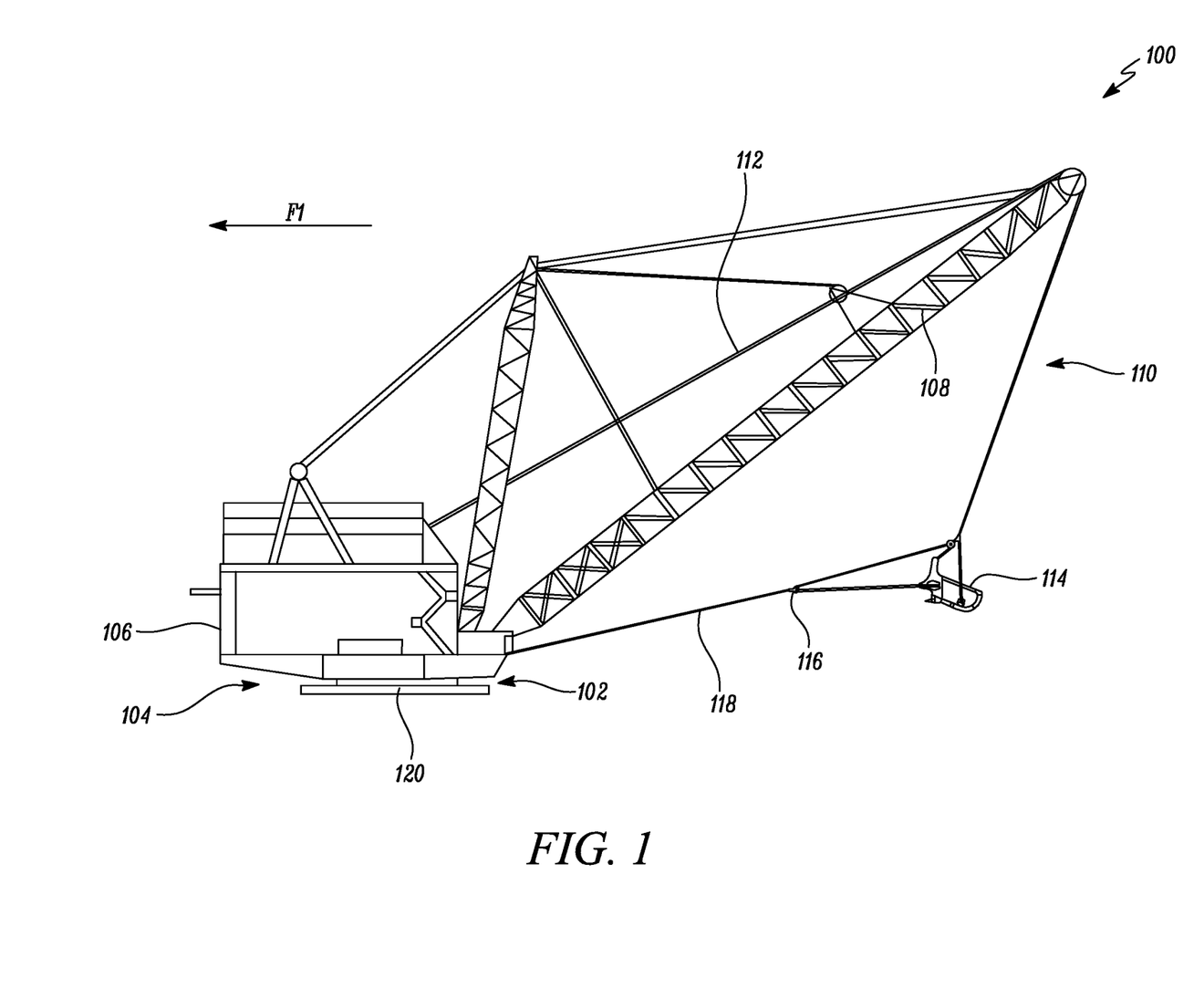
FIG. 1 is a side view of a machine, according to one embodiment of the present disclosure.

FIG. 1 illustrates a side view of an exemplary machine 100, according to an embodiment of the present disclosure. In the illustrated embodiment, the machine 100 is embodied as a dragline excavator. Alternatively, the machine 100 may include another type of earthmoving machine including walking assemblies 102 that will be explained in detail later in this section.

The machine 100 defines a left side 104 and a right side (not shown) opposite the left side 104. The left side 104 and the right side are defined relative to a walking direction "F1" of the machine 100. The machine 100 also includes a machine frame 106. The machine 100 further includes a power source (not shown) supported by the machine frame 106. The power source may supply power to various components of the machine 100 for operation, movement, and the like. In one example, the power source may include an engine, such as a diesel engine, a gasoline engine, a gaseous fuel-powered engine, or any other type of combustion engine known in the art. In other examples, the power source may include an electric drive assembly having an electric motor (not shown).

Further, the machine 100 includes a boom 108 coupled to the machine frame 106. The machine 100 also includes a bucket rigging assembly 110 coupled to the machine frame 106. The bucket rigging assembly 110 includes one or more hoist ropes 112, a dragline bucket 114, a drag socket 116, and one or more dragropes 118. The hoist ropes 112 are coupled to the dragline bucket 114. The hoist ropes 112 pass over a pulley (not shown) at a top portion of the boom 108 and suspends the dragline bucket 114 therefrom. Further, the dragline bucket 114 is coupled to the drag rope 118 by the drag socket 116.

The machine 100 includes a base frame (not shown) that supports the machine 100 during operation. The machine 100 also includes the pair of walking assemblies 102 (only one of which is illustrated herein). The walking assemblies 102 are supported by the machine frame 106. The walking assemblies 102 allow movement/walking of the machine 100 on various ground surfaces. In the illustrated example, the machine 100 includes the walking assembly 102 at the left side 104 of the machine 100 and the walking assembly 102 at the right side of the machine 100. The walking assemblies 102 on the left side 104 and the right side are similar in operation and construction. Therefore, only the walking assembly 102 disposed at the left side 104 of the machine 100 will be explained in detail with reference to FIG. 2. However, it should be noted that details of the walking assembly 102 described herein is equally applicable to the waking assembly 102 disposed at the right side of the machine 100, without any limitations. It may be contemplated that the walking assemblies 102 of the present disclosure may be employed in various machines to facilitate walking of such machines, based on application requirements.

Figure 2:
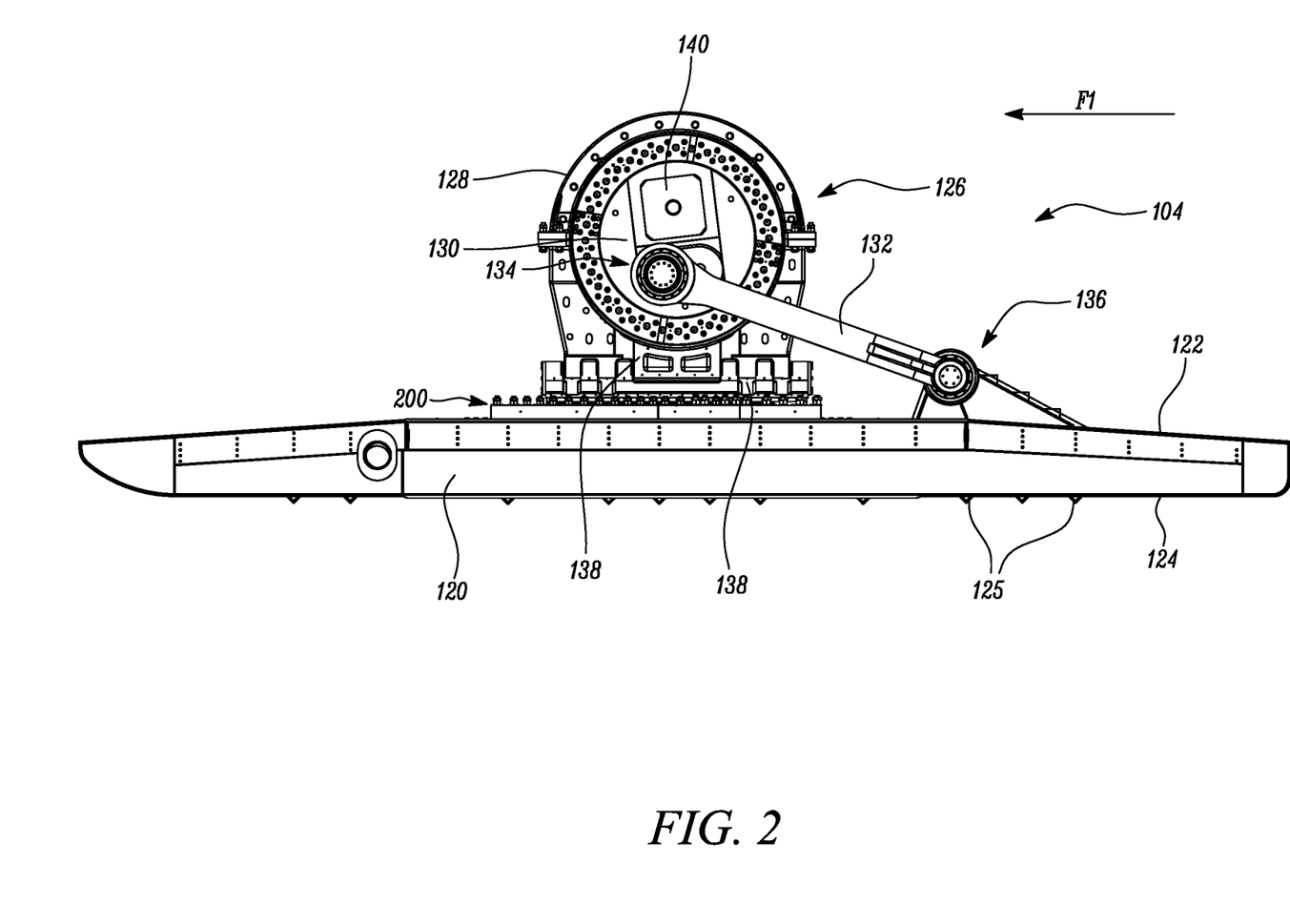
FIG. 2 illustrates a walking assembly associated with the machine of FIG. 1, the walking assembly includes a sliding assembly, according to one embodiment of the present disclosure.

Referring to FIG. 2, the walking assembly 102 includes a walking shoe 120. The walking shoe 120 includes a generally rectangular, hollow box shaped structure. The walking shoe 120 includes a top surface 122 and a bottom surface 124. The bottom surface 124 may include a number of tread members 125 to prevent slippage during a walk cycle. Further, the walking shoe 120 may include a number of stiffeners (not shown) extending between the top surface 122 and the bottom surface 124. The walking shoe 120 also defines a centrally disposed cavity (not shown).

The walking assembly 102 further includes a driving assembly 126. The walking shoe 120 may be connected to the machine frame 106 by the driving assembly 126. The driving assembly 126 includes a walking frame 128, a driving member 130 supported by the walking frame 128, and a linkage member 132 pivotally coupled to the driving member 130 at one end 134 and the walking shoe 120 at another end 136. The walking frame 128 includes a bearing (not shown) that rotatably receives the driving member 130. The walking frame 128 includes a two piece structure that is bolted together to define a space for receiving the bearing and the driving member 130. The walking frame 128 also includes a number of first structures 138. The first structures 138 are embodied as eye-shaped structures.

Further, the driving member 130 is generally embodied as a circular or disc shaped member. A driving shaft 140 is eccentrically connected to the driving member 130. The driving member 130 is driven by the driving shaft 140 that is generally transverse to the walking direction "F1" of the machine 100. The driving member 130 is keyed to the driving shaft 140 and rotates eccentrically about the driving shaft 140. As the driving member 130 is eccentrically mounted, rotation of the driving shaft 140 causes the walking frame 128 to move in a circular path about the driving shaft 140. Further, the driving shaft 140 has a generally square shaped end projecting outwardly at the left side 104 of the machine 100.

The driving member 130 is coupled to the walking shoe 120 by means of the linkage member 132. The linkage member 132 causes a horizontal movement of the walking shoe 120 in response to a rotation of the driving member 130. The linkage member 132 includes the end 134 pivotally coupled to the driving member 130. The linkage member 132 also includes the end 136 pivotally coupled to the walking shoe 120.

When the machine 100 is moving, the driving shaft 140 rotates such that one complete revolution of the driving shaft 140 causes one complete step in the walking direction "F1". In general, the rotation of the driving shaft 140 causes the walking shoe 120 to move downwards and in the waking direction "F1" until it contacts the ground surface. Further rotation of the driving shaft 140 causes a leading end of the base frame to be lifted off the ground surface and the machine 100 moves in the walking direction "F1". Continued rotation of the driving shaft 140 causes the base frame to be lowered to the ground surface and the walking shoe 120 to be raised. It should be noted that when the walking shoe 120 is lifted off the ground, the base frame rests on the ground surface to support the machine 100.

Figure 3:
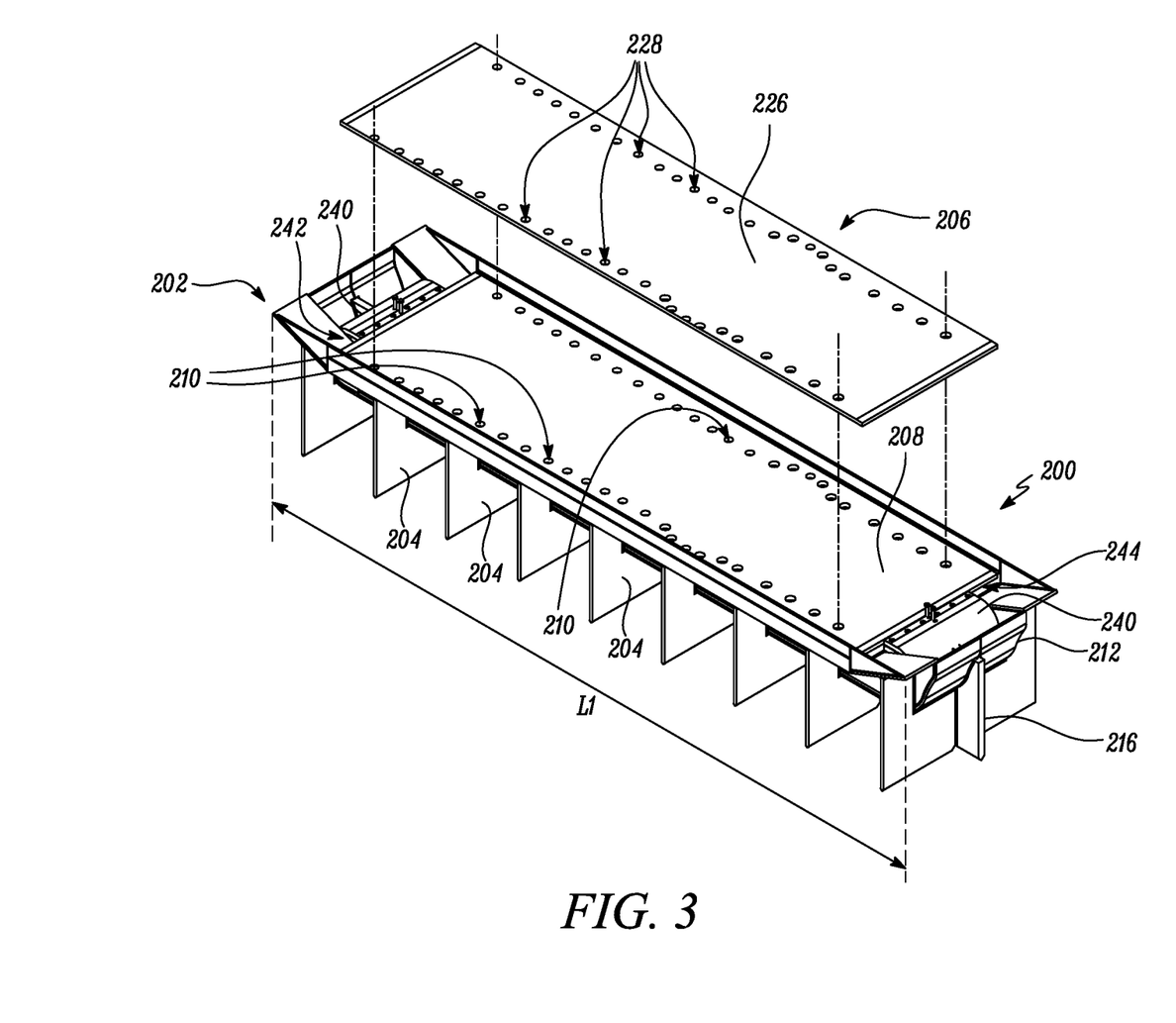
FIG. 3 is a perspective view of a support structure of the sliding assembly of FIG. 2, according to one embodiment of the present disclosure.

The walking assembly 102 further includes a sliding assembly 200 coupled to the walking shoe 120 and the walking frame 128 of the driving assembly 126. The sliding assembly 200 is coupled to the walking frame 128 such that the movement of the walking frame 128 in the circular path is translated into a horizontal movement of the sliding assembly 200. Referring to FIG. 3, the sliding assembly 200 includes a support structure 202 received within the walking shoe 120 (see FIG. 2). The support structure 202 includes a substantially box shaped structure that is receivable within centrally disposed cavity of the walking shoe 120. The support structure 202 may be made of a metal, such as, steel, brass, or any alloy. In some examples, the support structure 202 may be embodied as a fabricated piece that is coupled to the walking shoe 120 by welding.

In the illustrated example, the support structure 202 includes a number of first plates 204 that are substantially perpendicular to a plate member 206. The first plates 204 are generally rectangular in shape. The number of first plates 204 are coupled with the walking shoe 120. More particularly, the support structure 202 is coupled with the walking shoe 120 using the number of first plates 204 arranged along a length "L1" of the support structure 202. In the illustrated example, the first plates 204 are welded to the walking shoe 120. More particularly, the first plates 204 align with a number of diaphragms (not shown) in the walking shoe 120. The diaphragms are welded to the first plates 204. Further, a thermal stress relieving operation may be performed on the support structure 202, and/or the walking shoe 120, after the support structure 202 is coupled with the walking shoe 120.

Figure 4:
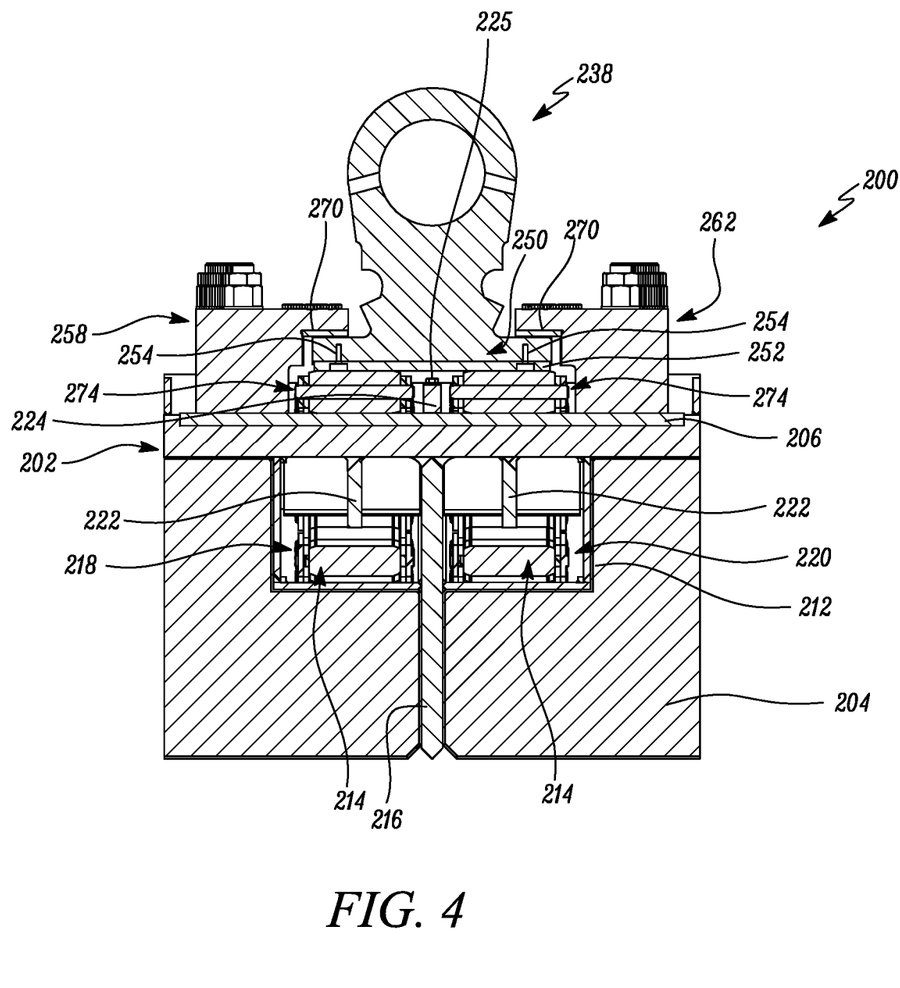
FIG. 4 is a cross-sectional view of the sliding assembly of FIG. 2, according to one embodiment of the present disclosure.

The support structure 202 defines an upper surface 208. The upper surface 208 of the support structure 202 is machined after the support structure 202 is subjected to the thermal stress relieving operation. Further, the support structure 202 defines a number of first holes 210 in communication with the upper surface 208. Referring to FIG. 4, the support structure 202 defines a housing 212 for receiving a portion of each of a pair of roller chains 214. The housing 212 defines a hollow enclosure that receives the portion of the pair of roller chains 214. The housing 212 may also hold some amount of a lubrication medium therein for lubrication of the roller chains 214.

The support structure 202 also includes a central support 216 extending centrally along the length "L1" of the support structure 202. The central support 216 divides the housing 212 into two portions 218, 220 such that each portion 218, 220 receives the corresponding roller chain 214 of the pair of roller chains 214. Moreover, a pair of full length stiffeners 222 are associated with the support structure 202. The stiffeners 222 extend along the length "L1" of the support structure 202 parallel to the central support 216.

The support structure 202 further includes a central guiding plate 224 extending between the pair of roller chains 214. The central guiding plate 224 may be embodied as a generally rectangular plate extending along the length "L1" of the support structure 202. The central guiding plate 224 is mounted between the pair of roller chains 214 to prevent the roller chains 214 from contacting each other during operation. The central guiding plate 224 is coupled to the plate member 206 by a number of mechanical fasteners 225 (one of which is illustrated herein).

Figure 5:
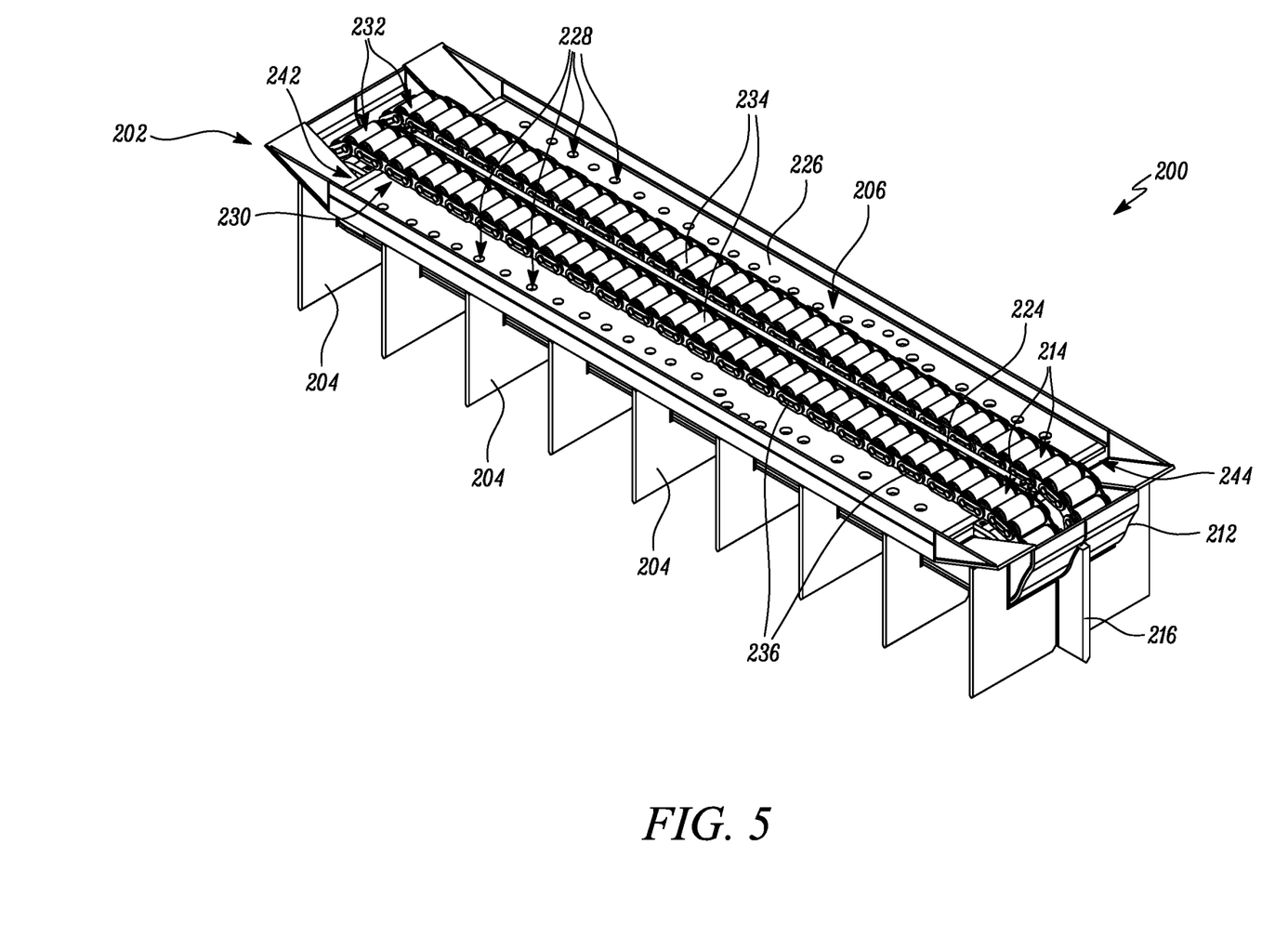
FIG. 5 is a perspective view of the sliding assembly of FIG. 2 including a pair of roller chains, according to one embodiment of the present disclosure.

As shown in FIGS. 3 and 5, the sliding assembly 200 also includes the plate member 206 mounted on the support structure 202. The plate member 206 defines a contact surface 226. The contact surface 226 include a generally planar surface. Further, the plate member 206 includes a hardened steel plate. More particularly, in the illustrated example, the plate member 206 is a hardened and ground steel plate. Typically, the plate member 206 is machined to provide smooth surfaces and achieve precise dimensions. The plate member 206 is aligned with the upper surface 208 (see FIG. 3) of the support structure 202. The plate member 206 is mounted on the upper surface 208. The contact surface 226 and the top surface 122 (see FIG. 2) of the walking shoe 120 are in the same plane when the plate member 206 is mounted on the upper surface 208.

The plate member 206 is generally rectangular in shape. A length and a width of the plate member 206 is similar to a length and a width of the upper surface 208. The plate member 206 defines a number of second through-holes 228 that align with the number of first holes 210 (see FIG. 3) in the support structure 202. The plate member 206 may also include lubrication channels (not shown) for lubrication purposes. The lubricating medium may flow through the lubrication channels for lubricating one or more components of the sliding assembly 200.

As shown in FIG. 5, the sliding assembly 200 further includes the pair of roller chains 214 disposed adjacent to each other. The pair of roller chains 214 define a first side 230 and a second side 232. The first and second sides 230, 232 are defines at opposite sides of the pair of roller chains 214. The pair of roller chains 214 roll on the contact surface 226 of the plate member 206 proximate the first side 230 of the pair of roller chains 214. In other words, the first side 230 of the corresponding roller chains 214 is in rolling contact with the plate member 206.

It should be noted that the roller chains 214 may include any type of chain assembly that facilitates a rolling motion. In this example, each roller chain 214 includes a number of rollers 234 adjacently disposed and connected to each other by chain links 236 and pins (not shown). During an operation of the walking assembly 102, some portions of each roller chains 214 is in rolling contact with the plate member 206, a sliding shoe 238, and a pair of roller chain guides 240, whereas remaining portion of each roller chain 214 is received in the housing 212.

The sliding assembly 200 includes the pair of roller chain guides 240 (see FIG. 3) disposed at opposing ends 242, 244 of the plate member 206. The pair of roller chains 214 are wrapped around the plate member 206 and the pair of roller chain guides 240. The roller chain guides 240 provide a guide path for the roller chains 214. The roller chain guides 240 may be generally semicircular in shape. A width of the roller chain guide 240 is decided such that the roller chains 214 may be accommodated thereon.

Figure 6:
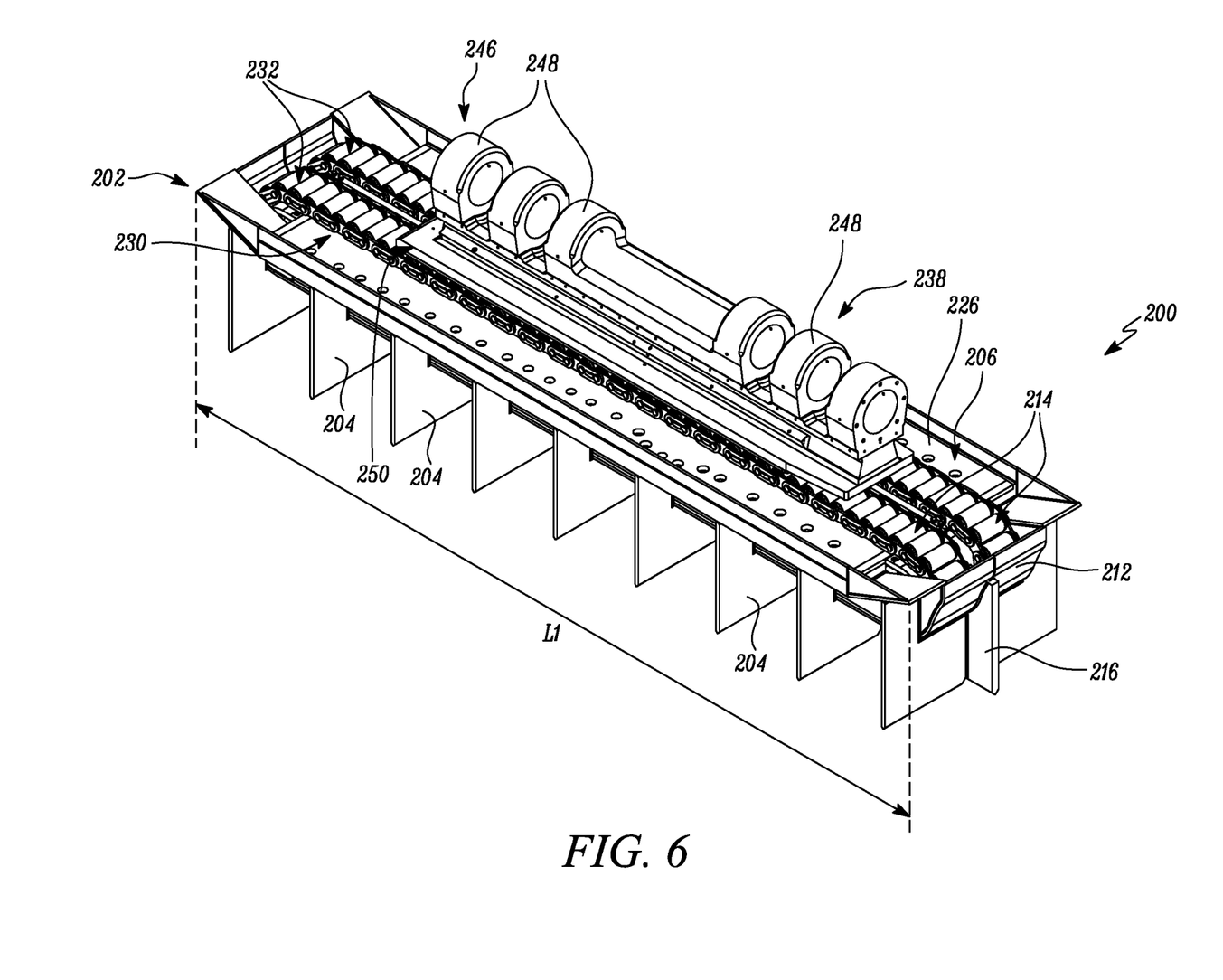
FIG. 6 is a perspective view of the sliding assembly of FIG. 2 including a sliding shoe, according to one embodiment of the present disclosure.

Referring to FIG. 6, the sliding assembly 200 also includes the sliding shoe 238 coupled with the walking frame 128. The sliding shoe 238 is in rolling contact with the pair of roller chains 214 proximate the second side 232 of the pair of roller chains 214. In other words, the second side 232 of each roller chain 214 is in rolling contact with the sliding shoe 238. The sliding shoe 238 is mounted above the pair of roller chains 214 such that the sliding shoe 238 rolls on the rollers 234 (see FIG. 5) of the rolling chains 214. The sliding shoe 238 moves along the length "L1" (see FIG. 5) of the support structure 202 when the machine 100 is walking. An upper portion 246 of the sliding shoe 238 is coupled to the walking frame 128 (see FIG. 2). The upper portion 246 of the sliding shoe 238 includes a number of second structures 248. The second structures 248 are embodied as eye-shaped structures. The second structures 248 align with the number of first structures 138 (see FIG. 2) of the walking frame 128 in order to receive pin members (not shown) for coupling the sliding shoe 238 with the walking frame 128.

Further, the sliding shoe 238 defines a base portion 250. The sliding shoe 238 includes a base plate 252 (shown in FIG. 4) coupled proximate the base portion 250 thereof. The base plate 252 may contact the rollers 234 (see FIG. 5) during machine operation. In the illustrated embodiment the base plate 252 includes a hardened steel plate. In some examples, the base plate 252 is ground and machined to provide smooth surfaces and achieve precise dimensions. Further, the base plate 252 described herein may include a single piece design.

The base plate 252 may be coupled with the base portion 250 of the sliding shoe 238 using a number of mechanical fasteners 254 (shown in FIG. 4), such as bolts, screws, rivets, pins, and like. Further, the base plate 252 may be drilled to form mounting holes that align with mounting holes in the base portion 250 for coupling the base plate 252 with the base portion 250 using the mechanical fasteners 254. The base portion 250 and the base plate 252 are substantially rectangular in shape. A length of the sliding shoe 238 may be decided based on dimensions of the driving member 130, the linkage member 132, and/or other components of the walking assembly 102. Moreover, the base plate 252 may include lubrication channels (not shown) that are in fluid communication with lubrication channels in other portions of the sliding shoe 238 and the lubrication channels in the plate member 206. Further, the lubricating medium may pass through such lubrication channels for lubrication of the roller chains 214

Figure 7:
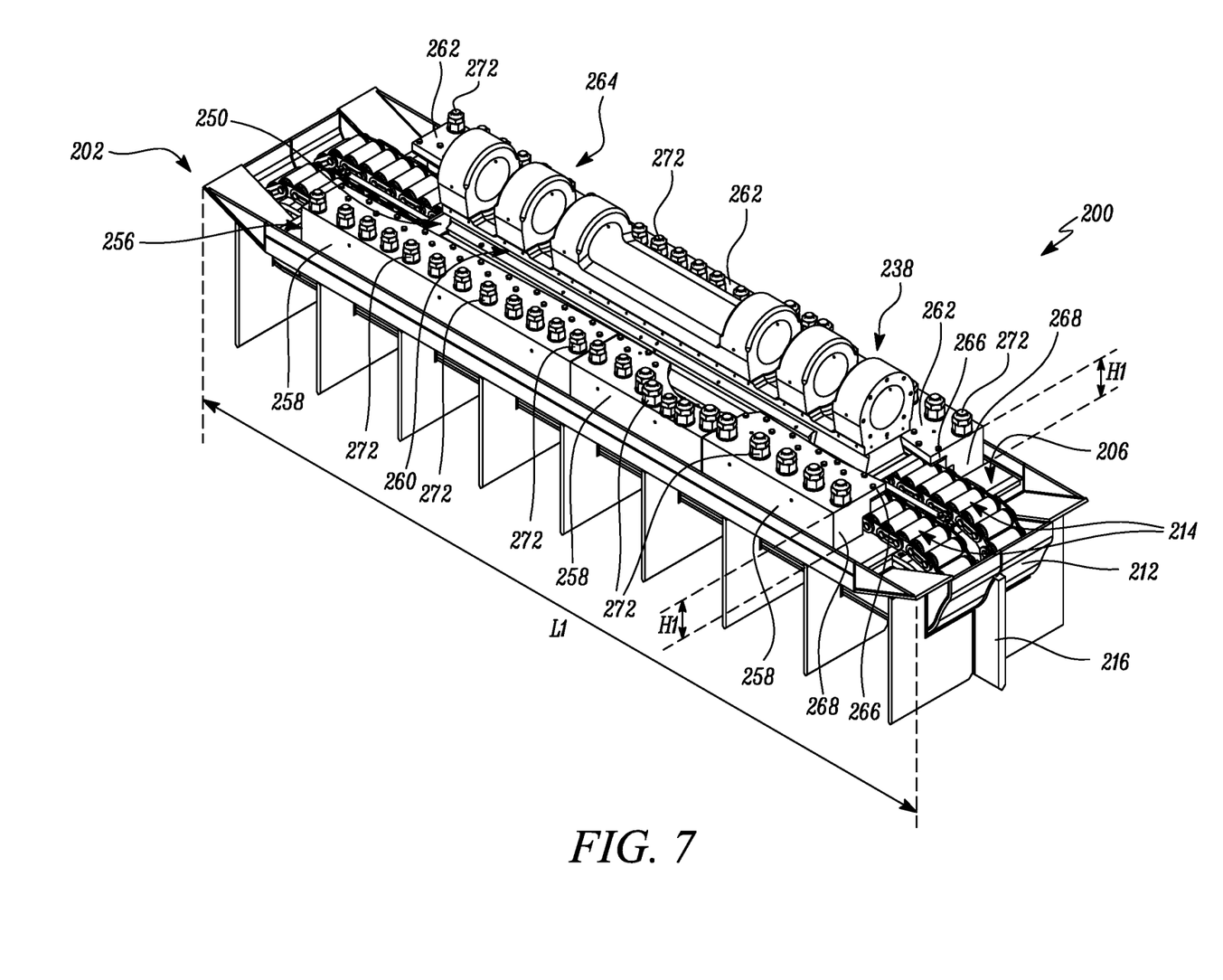
FIG. 7 is a perspective view of the sliding assembly of FIG. 2 including a guiding assembly, according to one embodiment of the present disclosure.

As shown in FIG. 7, the sliding assembly 200 further includes a guiding assembly 256 coupled with the support structure 202. The guiding assembly 256 retains the sliding shoe 238 in rolling contact with the pair of roller chains 214. Also, the guiding assembly 256 guides the sliding shoe 238 when the sliding shoe 238 rolls on the roller chains 214 and also allows centering of the sliding shoe 238. Moreover, in some examples, the sliding shoe 238 may be lubricated through lubrication channels in the guiding assembly 256. A length of the guiding assembly 256 is such that the guiding assembly 256 may allow retention of the sliding shoe 238 during a maximum travel of the sliding shoe 238.

The guiding assembly 256 includes a number of first guiding members 258 disposed proximate a first end 260 of the sliding shoe 238 and a plurality of second guiding members 262 disposed proximate a second end 264 of the sliding shoe 238. The plate member 206 is disposed between the support structure 202 and the first and second guiding members 258, 262. The first and second guiding members 258, 262 may be made of a metal, such as steel. The first and second guiding members 258, 262 extend along the length "L1" of the support structure 202 on the first and second ends 260, 264 of the sliding shoe 238. Further, each guiding member 258, 262 defines a height "H1" that is greater than a diameter of the roller chains 214 and a height of the base portion 250 so that the roller chains 214 and the base portion 250 may be accommodated between each guiding member 258, 262 and the plate member 206. It should be further noted that each guiding member 258, 262 may include different lengths based on application requirements.

Each guiding member 258, 262 includes a first portion 266 and a second portion 268 disposed such that each guiding member 258, 262 defines a substantially L-shaped structure. The first portion 266 includes a plate 270. The plate 270 is embodied as a brass plate herein. Alternatively, the plate 270 may include a steel plate. The plate 270 contacts the base portion 250 of the sliding shoe 238. The plate 270 is substantially rectangular in shape. Further, the plate 270 is ground and machined to provide smooth surfaces and to achieve precise dimensions. In one example, the plate 270 may be coupled to the first portion 266 of the corresponding guiding members 258, 262 using mechanical fasteners, not shown, such as bolts, screws, pins, and the like. In other embodiments, other fastening means may be used for coupling the plate 270 with the corresponding guiding members 258, 262. Further, the second portion 268 is in contact with the plate member 206.

Moreover, each guiding member 258, 262 includes a number of third through-holes (not shown). The number of first guiding members 258 and the number of second guiding members 262 are coupled with the support structure 202 by a number of mechanical fasteners 272. The third through-holes, the second through-holes 228, and the first holes 210 are aligned to receive the number of mechanical fasteners 272 for coupling the guiding members 258, 262 with the support structure 202. Thus, the mechanical fasteners 272 couple the guiding members 258, 262 with the plate member 206 and the support structure 202. The mechanical fasteners 272 are embodied as bolts herein. In other embodiments, the mechanical fasteners 272 may include pins, rivets, or screws. In some embodiments, the first and second guiding members 258, 262 may be welded to the support structure 202. Further, a cut-out 274 is defined in the guiding member 258, 262 to provide clearance and guiding of the roller chains 214.

INDUSTRIAL APPLICABILITY

The present disclosure relates to the sliding assembly 200 associated with the walking assembly 102. The sliding assembly 200 described herein provides a means to replace wear prone sliding motion of conventional designs with a rolling motion that is facilitated by incorporation of the roller chains 214. More particularly, the roller chains 214 provide rolling contact between the sliding shoe 238 and the roller chains 214 as well as between the roller chains 214 and the plate member 206. As the sliding shoe 238 of the sliding assembly 200 rolls on the pair of roller chains 214 while the sliding shoe 238 moves through a walk cycle, friction between components of the sliding assembly 200 is minimized. Further, various components of the sliding assembly 200 can be easily lubricated using various lubrication channels provided in one or more components of the sliding assembly 200, such as the plate member 206, the sliding shoe 238, and the guiding assembly 256.

The sliding assembly 200 includes the support structure 202 that is embodied as a heavy fabricated unit. The support structure 202 supports the roller chains 214 as well as improves rigidity of the walking shoe 120. Further, the support structure 202 includes a central support 216 and the stiffeners 222 that provide strength and rigidity to the support structure 202. Moreover, the central guiding plate 224 and the central guiding plate 224 of the support structure 202 prevents misalignment of the roller chains 214 of the support structure 202. The plate member 206 and the roller chains 214 may further increase a rigidity of the walking shoe 120. Additionally, the sliding assembly 200 can be retrofitted on existing machines. For example, a walking shoe of an existing machine may be machined to define a box shaped cavity. Further, the sliding assembly 200, and more particularly the support structure 202, may be disposed in the cavity machined in the existing walking shoe.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A walking assembly for a machine, the walking assembly comprising:
 a walking shoe;
 a driving assembly including a walking frame, a driving member supported by the walking frame, and a linkage member pivotally coupled to the driving member at one end and the walking shoe at another end; and
 a sliding assembly coupled to the walking shoe and the walking frame of the driving assembly, the sliding assembly including:
  a support structure adapted to be received within the walking shoe;
  a plate member mounted on the support structure, the plate member defining a contact surface;
  a pair of roller chains disposed adjacent to each other, the pair of roller chains defining a first side and a second side, wherein the pair of roller chains are adapted to roll on the contact surface of the plate member proximate the first side of the pair of roller chains;
  a sliding shoe adapted to be coupled with the walking frame, wherein the sliding shoe is in rolling contact with the pair of roller chains proximate the second side of the pair of roller chains; and
  a guiding assembly adapted to be coupled with the support structure, wherein the guiding assembly is adapted to retain the sliding shoe in rolling contact with the pair of roller chains.

2. The walking assembly of claim 1, wherein the sliding assembly further includes a pair of roller chain guides disposed at opposing ends of the plate member.

3. The walking assembly of claim 1, wherein the plate member includes a hardened steel plate.

4. The walking assembly of claim 1, wherein the sliding shoe includes a base plate coupled proximate a base portion thereof.

5. The walking assembly of claim 4, wherein the base plate includes a hardened steel plate.

6. The walking assembly of claim 1, wherein the guiding assembly includes a plurality of first guiding members disposed proximate a first end of the sliding shoe and a plurality of second guiding members disposed proximate a second end of the sliding shoe.

7. The walking assembly of claim 6, wherein the plurality of first guiding members and the plurality of second guiding members are adapted to be coupled with the support structure by a plurality of mechanical fasteners.

8. The walking assembly of claim 1, wherein the support structure includes a central guiding plate extending between the pair of roller chains.

9. The walking assembly of claim 1, wherein the support structure includes a plurality of first plates that are substantially perpendicular to the plate member, the plurality of first plates being adapted to be coupled with the walking shoe.

10. The walking assembly of claim 1, wherein the support structure defines a housing for receiving a portion of each of the pair of roller chains.

11. The walking assembly of claim 1, wherein the machine includes a pair of walking assemblies.

12. A machine comprising:
 a machine frame; and
 a pair of walking assemblies supported by the machine frame, wherein each walking assembly includes:
  a walking shoe;
  a driving assembly including a walking frame, a driving member supported by the walking frame, and a linkage member pivotally coupled to the driving member at one end and the walking shoe at another end; and
  a sliding assembly coupled to the walking shoe and the walking frame of the driving assembly, the sliding assembly including:
   a support structure adapted to be received within the walking shoe;
   a plate member mounted on the support structure, the plate member defining a contact surface;
   a pair of roller chains disposed adjacent to each other, the pair of roller chains defining a first side and a second side, wherein the pair of roller chains are adapted to roll on the contact surface of the plate member proximate the first side of the pair of roller chains;
   a sliding shoe adapted to be coupled with the walking frame, wherein the sliding shoe is in rolling contact with the pair of roller chains proximate the second side of the pair of roller chains; and
   a guiding assembly adapted to be coupled with the support structure, wherein the guiding assembly is adapted to retain the sliding shoe in rolling contact with the pair of roller chains.

13. The machine of claim 12, wherein the sliding assembly further includes a pair of roller chain guides disposed at opposing ends of the plate member.

14. The machine of claim 12, wherein the plate member includes a hardened steel plate.

15. The machine of claim 12, wherein the sliding shoe includes a base plate coupled proximate a base portion thereof.

16. The machine of claim 15, wherein the base plate includes a hardened steel plate.

17. The machine of claim 12, wherein the guiding assembly includes a plurality of first guiding members disposed proximate a first end of the sliding shoe and a plurality of second guiding members disposed proximate a second end of the sliding shoe.

18. The machine of claim 17, wherein the plurality of first guiding members and the plurality of second guiding members are adapted to be coupled with the support structure by a plurality of mechanical fasteners.

19. The machine of claim 12, wherein the support structure includes a central guiding plate extending between the pair of roller chains.

20. The machine of claim 12, wherein the support structure includes a plurality of first plates that are substantially perpendicular to the plate member, the plurality of first plates being adapted to be coupled with the walking shoe.

* * * * *